3,740,326
CHLORIDE SELECTIVE ELECTRODE
Willard T. Grubb, Schenectady, N.Y., assignor to
General Electric Company, Schenectady, N.Y.
Filed June 18, 1971, Ser. No. 154,401
Int. Cl. G01n 27/46
U.S. Cl. 204—195 M          8 Claims

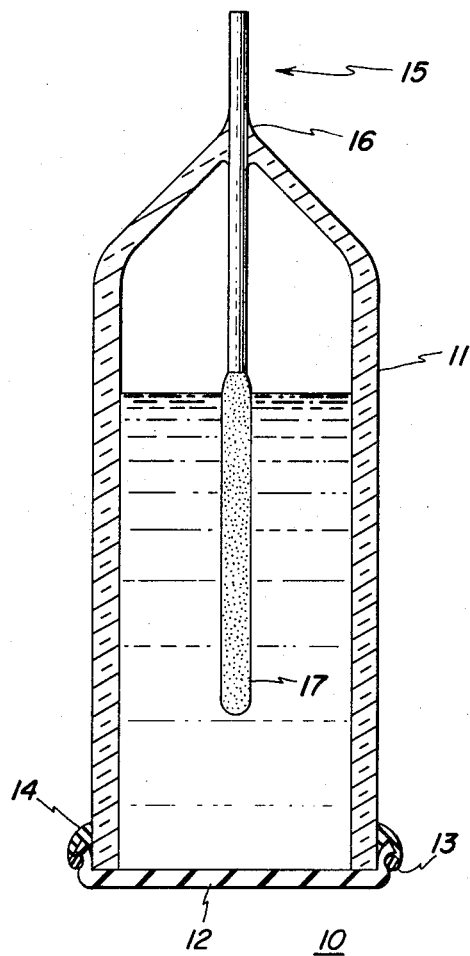

ABSTRACT OF THE DISCLOSURE

An anion-selective electrode has an open ended non-ion-selective tube, an anion-selective nylon disc sealed to one open end of the tube, a silver wire with a silver chloride portion positioned within the tube, a chloride solution within the tube and in contact with the silver chloride portion of the silver wire, a closure over the opposite end of the tube with an aperture therein, and a portion of the silver wire extending through the aperture in the closure to the exterior of the tube.

---

This invention relates to anion-selective electrodes and more particularly to such anion-selective electrodes employing an anion-selective nylon disc.

In electrochemical measurements, a reference electrode is employed with a measuring or sensing electrode, such as a glass electrode, with both electrodes immersed in a solution, whereby the potential difference between the two electrodes is a function of the concentration of a specific ion in the solution.

My present invention is directed to an improved anion-selective electrode which is suitable for biomedical, environmental control and other applications.

The primary object of my invention is to provide a rugged and dependable anion-selective electrode employing a disc of anion-selective material.

In accordance with one aspect of my invention, an anion-selective electrode comprises a tube of non-ion selective material, a disc of anion-selective nylon material, a room temperature sealant sealing the disc to one open end of the tube, a silver wire with a silver chloride portion positioned within the tube, a chloride solution within the tube and in contact with the silver chloride portion of the silver wire, a closure over the opposite end of the tube with an aperture therein, and a portion of the silver wire extending through the aperture in the closure to the exterior of the tube.

These and various other objects, features and advantages of the invention will be better understood from the following description taken in connection with the accompanying drawing in which:

The single figure is a sectional view of an anion-selective electrode made in accordance with my invention.

In the single figure of the drawing there is shown generally at 10 an anion-selective electrode made in accordance with my invention. A tube 11 of non-ion-selective material, such as glass has a disc 12 of anion-selective nylon material sealed to one open end of glass tube 11 by an O ring 13 holding the edges of disc 12 against the exterior surface of tube 11, and a room temperature sealant 14, such as, a room temperature silicone sealant. A silver wire 15 is positioned partially within tube 11 at an end 16 and extends outwardly from end 16. Tube 11 is sealed at end 16 to wire 15. At least a portion of silver wire 15 within tube 11 has a coating 17 of silver chloride thereon.

I found that suitable non-ion-selective materials include glass tube, thick nylon tube, polyolefin tube, and heat shrinkable polyolefin tube. The anion-selective nylon materials include various types of material under this generic designation. Preferred types are type 6 nylon, type 6/6 nylon, and blends thereof. The nylon material is sealed to one open end of the non-ion-selective material tube by various methods. In addition to the O ring and sealant described above, the nylon disc can be sealed to the open tube end by a threaded cap with a central aperture which is threaded on the threaded portion adjacent the open end of the tube. Similarly, the disc can be sealed in place by an apertured cap which is fastened to a flange at the open tube end, for example, by threaded fasteners. The preferred solution within the non-ion-selective material tube is a dilute potassium chloride solution. However, other suitable chloride solutions include NaCl, $MgCl_2$, etc.

In an illustrative operation of my electrode, the electrode is assembled as above described using a potassium chloride solution. An associated reference electrode is placed in a solution into which is placed the anion-selective electrode. The potential difference between the two electrodes is a function of the concentration of the chloride ion in the solution.

Examples of anion-selective electrodes in accordance with my invention are set forth below:

EXAMPLE I

An anion-selective electrode was made as described above and as shown generally in the drawing. A non-ion-selective glass tube with opposite open ends had sealed on one end thereof a 0.001 inch thick disc of anion-selective nylon, designated as type 6 nylon, by an O ring and silicone sealant. After the seal had been allowed to cure for 24 hours, the tube was filled with a 0.1 molar solution of potassium chloride. A silver wire with a chlorided silver portion was positioned within the tube in contact with the solution and extended out from the opposite open end of the tube. The tube was sealed to the wire by heat shrinkable tubing. This structure resulted in an anion-selective electrode for measuring chloride ion activity.

EXAMPLE II

The electrode formed above in Example I was tested in series of potassium chloride solutions. Its voltage against a silver-silver chloride 3 N KCl salt bridge reference electrode was as follows:

| Concentration of KCl (moles/liter): | EMF in millivolts |
|---|---|
| $10^{-5}$ | +239 |
| $10^{-4}$ | +222 |
| $10^{-3}$ | +177 |
| $10^{-2}$ | +131 |
| $10^{-1}$ | +84 |

This electrode senses chloride ions with a voltage change of 46 to 49 millivolts per decade change of chloride ion concentration from $10^{-4}$ to $10^{-1}$ moles/l. of chloride ion concentration.

EXAMPLE III

An anion-selective electrode was made as described generally above. A non-ion selective polymethylmethacrylate tube with opposite open ends had sealed on one end thereof a 0.001 inch thick disc of anion-selective nylon, designated as type 6 nylon, by a mechanical flange seal. The tube was filled with a 0.1 molar solution of potassium chloride. A commercial saturated calomel electrode was positioned within the tube in contact with the solution and extended out from the opposite initially opened end of the tube through an aperture. This structure resulted in an anion-selective electrode for measuring chloride ion activity.

EXAMPLE IV

The electrode formed above in Example III was tested in a series of potassium chloride solutions. Its voltage against an external saturated calomel reference electrode was as follows:

| Concentration of KCl (moles/liter): | EMF in millivolts |
|---|---|
| $10^{-5}$ | +209 |
| $10^{-4}$ | +166 |
| $10^{-3}$ | +112 |
| $10^{-2}$ | +57 |
| $10^{-1}$ | 0 |
| 1 | −41 |

Thus the electrode responds with voltage change of 54 to 57 mv. per decade change in chloride ion concentration in the range from $10^{-4}$ to $10^{-1}$ moles/liter.

EXAMPLE V

An anion-selective electrode was made as described generally above. A thick and therefore nonion-selective nylon tube with opposite open ends had sealed on one end thereof, a 0.005 inch thick disc of anion-selective nylon, designated as nylon 6/6 with a screw cap seal. The tube was filled with a 0.1 molar solution of potassium chloride. A silver wire with a chlorided silver portion was positioned within the tube in contact with the solution and extended out from the opposite initially opened end of the tube though an aperture in the tube which was shrunken on that end. This structure resulted in an ion-selective electrode for measuring chloride ion activity.

EXAMPLE VI

An anion-selective electrode was made as described generally above. A non-ion-selective tube of polymethylmethacrylate with opposite open ends had sealed on one end thereof by a mechanical flange seal a 0.0015 inch thick disc of anion-selective nylon which was a blend of type 6 and type 6/6 nylon. The tube was filled with a 0.1 molar solution of potassium chloride. A commercial saturated calomel reference electrode was positioned within the tube in contact with the solution and extended out from the opposite initially open end of the tube through an aperture. This structure resulted in an anion-selective electrode for measuring chloride ion activity.

EXAMPLE VII

The electrode formed in Example VI was tested in a series of potassium chloride solutions. Its voltage against an external saturated calomel reference electrode was as follows:

| Concentration of KCl in moles/liter: | EMF in millivolts |
|---|---|
| $10^{-4}$ | 167 |
| $10^{-3}$ | 112 |
| $10^{-2}$ | 57 |
| $10^{-1}$ | −2 |

Thus, the electrode responds with a voltage change of 55 to 59 millivolts decade of change in chloride ion concentration in the range from $10^{-4}$ to $10^{-1}$ moles per liter.

While other modifications of the invention and variations thereof which may be employed within the scope of the invention have not been described, the invention is intended to include such as may be embraced within the following claims.

What I claim as new and desire to secure by Letters Patent of the United States is:

1. A chloride ion-selective electrode comprises a non-ion-selective material tube having opposite open ends, a chloride ion-selective nylon material disc of a thickness from 0.001 inch to 0.005 inch sealed to the first open end, the chloride ion-selective nylon material disc selected from the class consisting of type 6 nylon, type 6/6 nylon, and blends thereof, a silver wire positioned partially within the tube at the second end thereof and extending outwardly from the second end, the tube bonded to the silver wire at the second end, a coating of silver chloride on a portion of the silver wire positioned within the tube, and a metallic chloride solution filling the tube and in contact with the silver chloride coating on the silver wire.

2. A chloride ion-selective electrode as in claim 1, in which the tube is thick non-chloride ion-selective nylon.

3. A chloride ion-selective electrode as in claim 1, in which the tube is non-chloride ion-selective glass.

4. A chloride ion-selective electrode as in claim 1, in which the tube is a polymethylmethacrylate polymer.

5. A chloride ion-selective electrode as in claim 1, in which the tube is non-chloride ion-selective glass, the electrolyte is potassium chloride, and the nylon material is type 6 nylon.

6. A chloride ion-selective electrode as in claim 1, in which the tube is polymethylmethacrylate, the electrolyte is potassium chloride, and the nylon material is type 6 nylon.

7. A chloride ion-selective electrode as in claim 1, in which the tube is thick nylon, the electrolyte is potassium chloride, and the nylon material is type 6/6 nylon.

8. A chloride ion-selective electrode as in claim 1, in which the tube is polymethylmethacrylate, the electrolyte is potassium chloride, and the nylon material is a blend of type 6 nylon and type 6/6 nylon.

References Cited

UNITED STATES PATENTS

| 3,000,804 | 9/1961 | Cahoon et al. | 204—195 F |
| 3,065,151 | 11/1962 | Schaschl et al. | 204—195 C |
| 3,498,899 | 3/1970 | Kater et al. | 204—195 F |

OTHER REFERENCES

Graham, "Electroplating Engineering Handbook," 2d ed., 1962, p. 693.

TA-HSUNG TUNG, Primary Examiner

U.S. Cl. X.R.

204—1 T, 195 F